(12) United States Patent
Brenninger (10) Patent No.: US 11,780,498 B2
(45) Date of Patent: Oct. 10, 2023

(54) UTILITY VEHICLE BRAKING

(71) Applicant: AGCO International GmbH, Neuhausen (CH)

(72) Inventor: Martin Brenninger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 624 days.

(21) Appl. No.: 16/770,506

(22) PCT Filed: Oct. 26, 2018

(86) PCT No.: PCT/EP2018/079468
§ 371 (c)(1),
(2) Date: Jun. 5, 2020

(87) PCT Pub. No.: WO2019/110199
PCT Pub. Date: Jun. 13, 2019

(65) Prior Publication Data
US 2021/0163064 A1 Jun. 3, 2021

(30) Foreign Application Priority Data
Dec. 8, 2017 (GB) .................................. 1720475

(51) Int. Cl.
*B62D 11/00* (2006.01)
*B62D 11/08* (2006.01)
(Continued)

(52) U.S. Cl.
CPC .............. *B62D 11/08* (2013.01); *B60T 11/21* (2013.01); *B60T 8/322* (2013.01); *B60W 30/045* (2013.01); *B60W 2720/403* (2013.01)

(58) Field of Classification Search
CPC ....... B62D 11/08; B62D 11/24; B62D 11/003; B60T 2270/302; B60T 8/1755;
(Continued)

(56) References Cited

U.S. PATENT DOCUMENTS

| | | | |
|---|---|---|---|
| 2005/0240332 A1* | 10/2005 | Mori .................... | B60T 8/1755 701/72 |
| 2007/0050112 A1* | 3/2007 | Kroehnert .......... | B60T 8/17555 701/91 |

(Continued)

FOREIGN PATENT DOCUMENTS

| DE | 9204417 U1 | 7/1992 |
|---|---|---|
| EP | 0 295 396 A2 | 12/1988 |

(Continued)

OTHER PUBLICATIONS

UK Intellectual Property Office, Search Report for priority application No. GB1720475.1, dated May 11, 2018.
(Continued)

*Primary Examiner* — Truc M Do (57) ABSTRACT

A method of brake steering in a four-wheel drive utility vehicle having a driven front axle carrying at least two front wheels, a driven rear axle carrying at least two rear wheels, a powertrain delivering torque to the front and rear axles via a connecting shaft, a controlled clutch arrangement in the connecting shaft operable to vary the distribution of delivered torque between the front and rear axles, and independently operable service brakes on each of the front and rear wheels. The method comprises, on the vehicle entering a turn, applying the service brakes of the front and rear wheels on the inside of the turn and adjusting the clutch arrangement to adapt the share of the available torque between the front and rear axles. Additional braking force may be applied from independently operable park brakes on the rear wheels in inverse relationship to the level of service brake force applied.

23 Claims, 5 Drawing Sheets

(51) Int. Cl.
*B60T 11/21* (2006.01)
*B60T 8/32* (2006.01)
*B60W 30/045* (2012.01)

(58) Field of Classification Search
CPC ........ B60T 11/21; B60T 2201/14; B60T 8/17;
B60T 8/176; B60T 8/1769; B60T 8/246;
B60T 8/322; B60W 30/045; B60W
2720/403
See application file for complete search history.

(56) References Cited

U.S. PATENT DOCUMENTS

| 2012/0330524 | A1* | 12/2012 | Rahman | B60W 30/18036 |
| | | | | 701/70 |
| 2013/0173100 | A1* | 7/2013 | Takagi | B60L 3/0061 |
| | | | | 180/65.265 |
| 2014/0378274 | A1* | 12/2014 | Umemoto | F16H 61/431 |
| | | | | 477/40 |
| 2015/0051795 | A1* | 2/2015 | Keys, II | B60W 30/18036 |
| | | | | 701/41 |
| 2017/0174078 | A1 | 6/2017 | Baker | |

FOREIGN PATENT DOCUMENTS

| EP | 0 863 063 A1 | 9/1998 |
| EP | 2896540 A | 7/2015 |
| EP | 3 028 908 A1 | 6/2016 |
| JP | 2011051561 A | 3/2011 |
| SU | 688353 A1 | 9/1979 |

OTHER PUBLICATIONS

European Patent Office, International Search Report for parent International Patent Application No. PCT/EP2018/079468, dated Jan. 30, 2019.

\* cited by examiner

UTILITY VEHICLE BRAKING

BACKGROUND

Field

The present invention relates to braking systems for utility vehicles, particularly self-propelled four-wheel drive agricultural machines, and more particularly to such systems where controlled braking is applied to the inner wheels of a turning vehicle in order to reduce turning radius.

Description of Related Art

With the growing size of agricultural machinery, the net power of agricultural machines such as tractors is also increasing. This also results in an increase in tyre size to transfer the power to the ground. The increasing tyre size also helps to reduce soil compaction which has negative impact on crop growth. However, the increased tyre size has the result that, when the vehicle is turning, parts of the tyres move towards the area where the engine is installed (engine periphery). Therefore there is a limitation in steering angle which impacts the steering capability in terms of turning radius, but the minimum turning radius is very important for manoeuvrability (e.g. when turning on a headland in a field). In addition, stricter exhaust gas emission requirements result in more installation space being required in the front area (e.g. for cooling systems or exhaust emission treatment systems), especially in the engine periphery penetrated by the tyres during steering. Enlarging the installation space in this area, especially the width transverse to driving direction, limits the steering angle of the tractor. A narrow track width also limits the steering angle which is an issue for e.g. the US market which has a strong demand for narrow-tracked tractors so that the tyres are able to move along narrow crop rows.

To mitigate the aforementioned problems it is known to have steering brake system. An example of a brake arrangement for steering braking of a utility vehicle is described in commonly-assigned European patent application EP-A-2896540. The vehicle has a cardan brake acting on the front axle, and separate left and right service brakes on the rear wheels. The left rear service brake is activated by movement of a first brake lever and the right rear service brake is activated by movement of a second brake lever. The left and right rear service brakes and the cardan brake are activated together by movement of both brake levers. To apply steering braking, only one of the brake levers is applied.

Utility vehicles intended for operation at relatively higher speeds are normally provided with two separate braking circuits and service brakes on each axle, whereby each circuit is assigned to one axle (in cars, the split is more commonly transverse). In consequence, for a utility vehicle the service brake force ratio for front and rear axle is thereby 50/50 which means that each axle is provided with only 50% of the total available braking force under normal operation. In the case of steering braking only with the rear axle (as in EP-A-2896540 above), the braking of only one side results in only half of the rear axle capacity being used, so only 25% of the total available braking force is applied. Compared to vehicles without front service brakes (which provide 100% of the steering force on the rear axle and 50% on one side during steering braking) this results in a major disadvantage of insufficient steering brake capability.

The main effect used during steering braking is that the braking of the rear axle on one side results in that the vehicle being virtually rotated about a vertical axis towards the inner curve side (similar to a track type tractor during differential steering). The front of the tractor is thereby moved out of the track which is given by the Ackermann-steering-track. The high weight of modern high horse power tractors is also present at the front and increases the front axle load. In combination, with the bigger wheel sizes on ail axles, it is getting increasingly difficult to move the inner front wheel inwards during steering braking.

OVERVIEW

In accordance with a first aspect of the invention there is provided a method of brake steering in a four-wheel drive utility vehicle having a driven front axle carrying at least two front wheels, a driven rear axle carrying at least two rear wheels, a powertrain delivering torque to the front and rear axles via a connecting shaft, a controlled clutch arrangement in the connecting shaft operable to vary the distribution of delivered torque between the front and rear axles, and independently operable service brakes on each of the front and rear wheels, the method comprising;

on the vehicle entering a turn, applying the service brakes of the front and rear wheels on the inside of the turn and adjusting the clutch arrangement to adapt the share of the available torque between the front and rear axles.

In addition to facilitating tighter turning in e.g. headland turns for big tractors, the controlled adaption of the torque transfer during steering braking results in more efficient curve driving, with reduced scrubbing leading to a reduction in soil damage. Furthermore, power is better transferred to the ground for better efficiency.

Where the vehicle is additionally provided with independently-operable parking brakes on each of the rear wheels the method may further comprise, on entering a turn applying also, and to a predetermined level of braking force, the parking brake on the rear wheel on the inside of the turn. Suitably, the level of parking brake braking force applied to a rear wheel on entering a turn is substantially proportional to the level of service brake braking force applied to the same wheel.

Preferably, the level of service brake braking force applied during a turn may be determined by the level of pressure exerted by a user of the vehicle on a brake control of the vehicle.

Preferably, on entering a turn, the share of the available torque delivered to the front axle is approximately 30% higher than that delivered before entering a turn, or the share may be controllably varied based on one or more of the following factors:

gross weight of the vehicle;
amount of front and/or rear ballasting carried by the vehicle;
weighting information pertaining to a towed or carried implement;
extent of measured wheel-slip for one or more wheels of the vehicle;
tyre pressure in one or more tyres on respective wheels of the vehicle;
angle of turn directed by a user of the vehicle;
current speed of the vehicle;
ambient conditions external to the vehicle.

Also in accordance with the present invention there is provided a driveline or a four-wheel drive utility vehicle comprising:
- a driven front axle carrying at least two front wheels;
- a driven rear axle carrying at least two rear wheels;
- a powertrain delivering torque to the front and rear axles via a connecting shaft;
- a controlled clutch arrangement in the connecting shaft operable to vary the distribution of delivered torque between the front and rear axles;
- independently operable service brakes on each of the front and rear wheels; and
- a control system coupled with the powertrain, clutch arrangement and service brakes, and configured to detect when the vehicle enters a turn, apply the service brakes of the front and rear wheels on the inside of the turn, and adjust the clutch arrangement to adapt the share of the available torque between the front and rear axles.

Preferably the driveline further comprises independently-operable parking brakes on the rear wheels, with the control system being configured on detecting that the vehicle is entering a turn to apply also, and to a predetermined level of braking force, the parking brake on the rear wheel on the inside of the turn, suitably with a level of parking brake braking force that is substantially proportional to the level of service brake braking force applied to the same wheel.

Further features of the driveline are recited in the attached claims, to which attention is now directed, and the disclosures of which are incorporated herein by reference.

Further in accordance with the present invention there is provided a utility vehicle including a driveline as set forth above. The utility vehicle may further comprise a geographical positioning system coupled with the control system, with the control system being configured to not implement the above-recited method of brake steering on determination that the vehicle is outside of a predetermined geographical area.

BRIEF DESCRIPTION OF THE DRAWINGS

Further advantages of the invention will become apparent from reading the following description of specific embodiments with reference to the appended drawings in which:—

DETAILED DESCRIPTION OF EXAMPLE EMBODIMENTS

Figure 1:
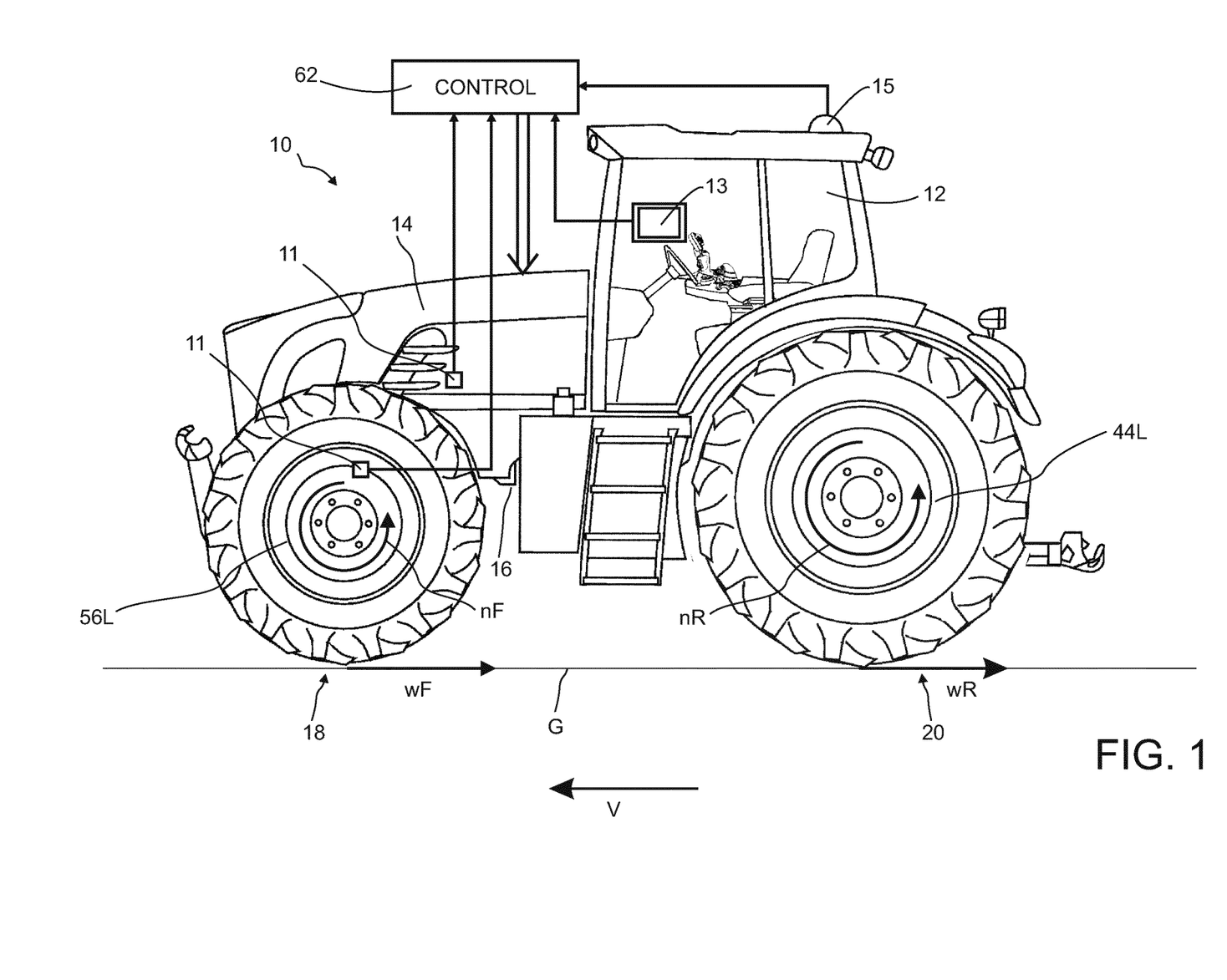
FIG. 1 is a representation of a utility vehicle, in the form of a tractor, suitably provided with a braking system embodying the present invention.

Referring to FIG. 1, a utility vehicle in the form of a tractor 10 is shown having a cab 12 and an engine compartment 14. A chassis 16 which is partly visible connects a front wheel suspension and steering assembly (indicated generally at 18) and a rear axle assembly (indicated generally at 20). A vehicle control system (represented schematically at 62) is coupled to receive data from a number of sensors 11: such data may include (but is not limited to):
- gross weight of the vehicle;
- amount of front and/or rear ballasting carried by the vehicle;
- weighting information pertaining to a towed or carried implement;
- extent of measured wheel-slip for one or more wheels of the vehicle;
- tyre pressure in one or more tyres on respective wheels of the vehicle;
- angle of turn directed by a user of the vehicle;
- current speed of the vehicle;
- ambient conditions external to the vehicle.

Further inputs to the control system 62 may come from a user-operable input device such as a touchscreen display and input device 13 positioned in the vehicle cab 12, and a geographical positioning system for the vehicle.

Figure 2:
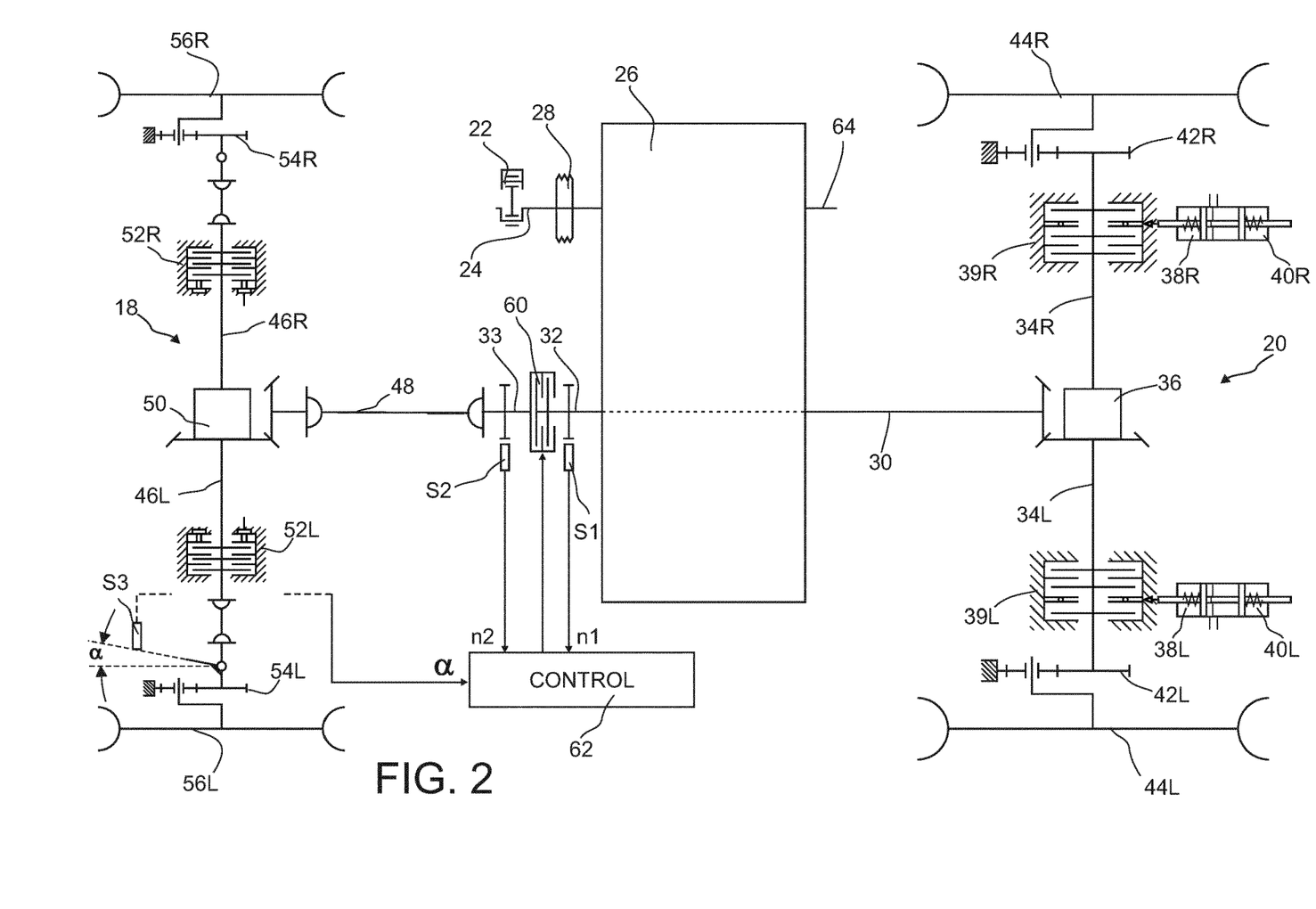
FIG. 2 is a schematic representation of the driveline arrangement of the tractor of FIG. 1.

Referring additionally to the driveline arrangement of FIG. 2, a prime mover such as an internal combustion engine 22 drives an input shaft 24 of a gearbox/transmission unit 26 via a flywheel 28. The transmission unit 26 may be configured to adapt gear ratios in a stepped or continuously variable mode to drive first 30 and second 32 output shafts.

Output shaft 30 drives the vehicle rear axle left and right driveshafts 34L, 34R via rear axle differential 36. Note the designations "front", "rear", "left" and "right" as used herein are taken from the point of view of a user/driver sat facing forward in the cab 12. The rear axle assembly 20 further comprises left and right rear axle service brakes 38L, 38R (with respective park brakes 40L, 40R), left and right rear axle final drives 42L, 42R, and left and right rear wheels 44L, 44R. As shown, the service and park brakes may share a common set of brake disks 39L, 39R, with the service brake being spring-biased to the open position and the park brake spring-biased to the closed position. Such an arrangement is described in e.g. German utility model DE9204417U1.

In like manner, output shaft 32 drives the vehicle front axle left and right driveshafts 46L, 46R via cardan shaft 48 and front axle differential 50. The front axle assembly 18 further comprises left and right front axle service brakes 52L, 52R, left and right front axle final drives 54L, 54R, and left and right front wheels 56L, 56R. Between the output shaft 32 and front axle differential 50 there is provided an all-wheel drive (AWD) clutch mechanism 60 by operation of which, under the direction of a vehicle control system 62 (described further below), the drive to the vehicle front wheels 56L, 56R may be selectively engaged or disengaged, or engaged with a controllably variable degree of clutch slippage to enable the engine output torque delivered to the front axle assembly 18 to be controllably varied such that the share of output torque between front and rear axles may be adapted.

A further output shaft 64 of the transmission unit 26 may be provided to drive a power take-off (PTO) shaft in conventional manner.

Figure 3:
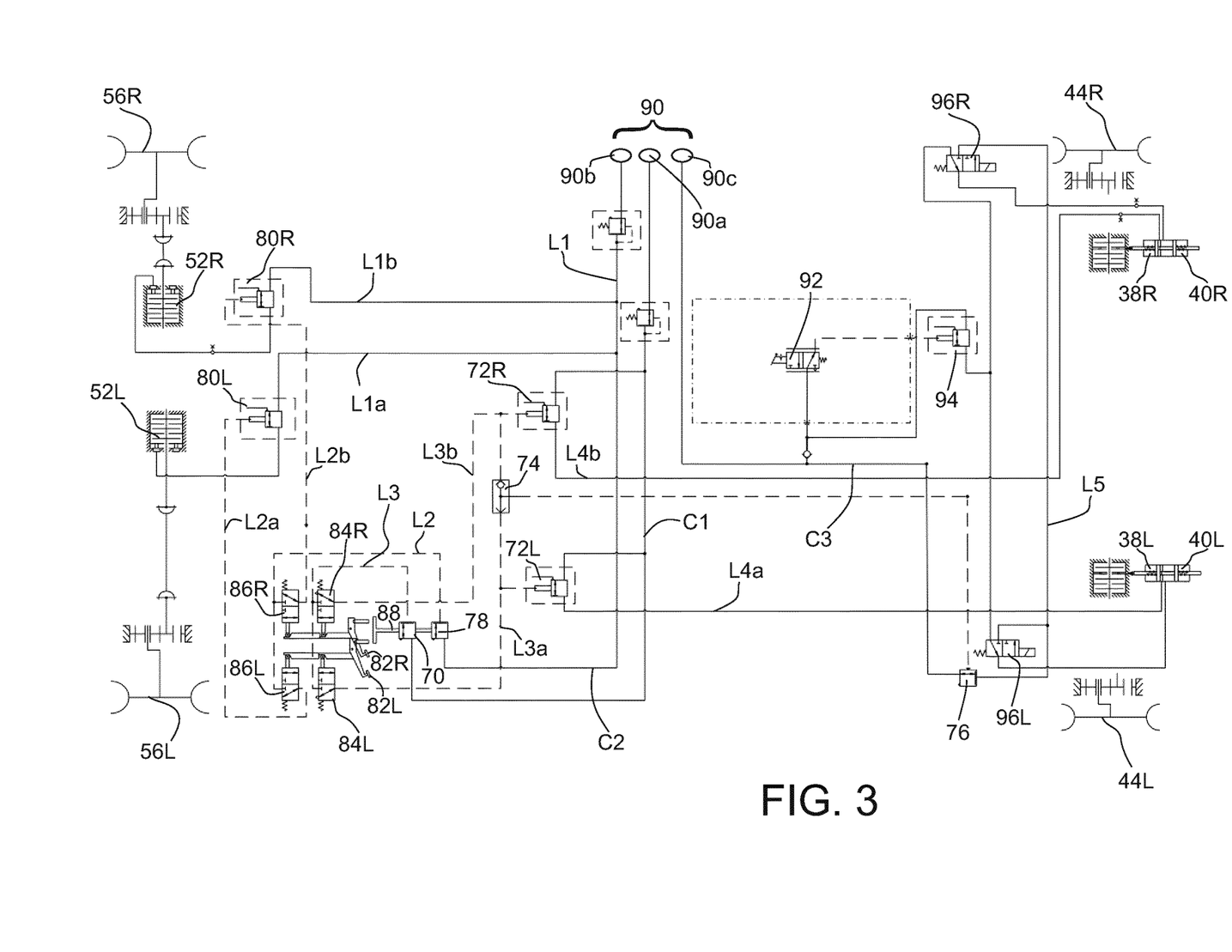
FIG. 3 is a schematic circuit diagram of a first embodiment of a pneumatically operable brake system for the tractor of FIG. 1.

FIG. 3 shows a schematic circuit diagram of a pneumatically operable brake system for the tractor 10 of FIG. 1. A first brake circuit C1 is provided for activating left and right rear service brakes 38L, 38R individually for application to left and right rear wheels 44L, 44R respectively. This first brake circuit C1 comprises a first pressure control valve 70 and supply lines L3, L3a, L3b, L4, L4a and L4b. Left and right rear service brakes 38L, 38R are operated by respective left and right associated brake relay valves 72L, 72R. Lines L3a and L3b are linked by a shuttle valve 74 which passes the greater pressure in either of the lines to proportional valve 76 in the control circuit for rear park brakes 40L, 40R (described below).

A second brake circuit C2 is provided for activating left and right front service brakes 52L, 52R individually for application to left and right front wheels 56L, 56R respectively. This second brake circuit C2 comprises a second pressure control valve 78 and supply lines L1, L1a, L1b, L2, L2a and L2b. Left and right front service brakes 52L, 52R are operated by respective left and right associated brake relay valves 80L, 80R.

The service brakes 38L, 38R, 52L, 52R are activated by the driver by two levers, such as two foot pedals 82L, 82R. Left or first foot pedal 82L, when pressed opens a left rear brake valve 84L and a left front brake valve 86L. Right or second foot pedal 82R when pressed opens a right rear brake valve 84R and a right front brake valve 86R. Pedals 82L, 82R will activate a piston or pistons 88 of a cylinder or cylinders (not shown) which activate the first and second pressure control valves 70, 78. Movement of either or both of the pedals 82L, 82R will activate both of the first and second pressure control valves 70, 78.

The service brakes 38L, 38R, 52L, 52R are connected to a fluid supply 90 such as a compressor, or air chamber via their respective brake relay valves 72L, 72R, 80L, 80R. When neither pedal 82L nor pedal 82R is pressed, the brake relay valves 72L, 72R, SOL, 80R are in a closed position which means that the brakes 38L, 38R, 52L, 52R are not activated. Each brake circuit C1, C2 is connected to a separate fluid reservoir of the fluid supply 90. The first brake circuit C1 including first control valve 70 is connected to fluid supply 90a, and the second brake circuit C2 including second control valve 78 is connected to fluid supply 90b.

The first control valve 70 switches left associated rear brake valve 72L, or right associated rear brake valve 72R, or both of them, to an open position via left and/or right brake valves 84L, 84R. When the associated rear brake valve 84L, 84R is open, the respective rear service brake 38L, 38R is activated. Associated rear brake valves 84L, 84R are connected in parallel.

The second control valve 78 switches left associated front brake valve SOL, or right associated front brake valve 80R, or both of them, to an open position via left and/or right brake valves 86L, 86R. When the associated front brake valve 86L, 86R is open, the respective front service brake 52L, 52R is activated. Associated front brake valves 86L, 86R are connected in parallel.

When neither of the pedals 82L, 82R is moved, the front and rear brake valves 86L, 86R, 84L, 84R are biased to a closed position. When both foot pedals 82L, 82R are pressed together, piston 88 activates first and second control valves 70, 78 and at the same time the front and rear brake valves 86L, 86R, 84L, 84R are opened. Air flows from the fluid supply 90b, along line L1, through second control valve 78, along line L2 through the front brake valves 86L, 86R and through to the respective front brake valves 80L, 80R which switches valves 80L, 80R to an open position. Air can then flow from the fluid supply 90b along line L1 and parallel lines L1a and L1b to the respective front service brakes 52L, 52R. At the same time, air also flows from the fluid supply 90a, along line L4 through first control valve 70, along line L3 through left and right brake valves 84L, 84R and along lines Lia, L3b through to associated brake relay valves 72L, 72R which switch valves 72L, 72R to an open position. Air can then flow from air supply 90a through line L4, through lines L4a and L4b to activate rear service brakes 38L, 38R. If the driver wishes to apply the brakes on one side only, for example the left front service brake 52L and left rear service brake 38L to help him steer left around a bend, the driver pushes the left foot pedal 82L only.

The rear park brakes 40L, 40R are controlled by a park brake control circuit C3 connected to a further separate reservoir 90c of fluid supply 90. In conventional operation, a park brake control valve 92, activated by a hand brake lever, is operable to connect the fluid supply, via a relay valve 94 and respective left and right rear solenoid valves 96L, 96R, to release the park brakes 40L, 40R. The solenoid valves 96L, 96R are spring biased to the operating position shown in which the output of relay valve 94 is connected to the park brakes 40L, 40R.

To enhance the brake steering operation, the park brakes 40L, 40R are used to supplement the braking pressure applied by the rear service brakes 38L, 38R. The fluid supply 90 from reservoir 90c is connected as a further input to proportional valve 76 (along with the output from shuttle valve 74 in circuit C1) with the proportional valve out put on line L5 being connected to the left and right rear solenoid valves 96L, 96R. Operating one of the rear solenoid valves (e.g. left rear solenoid valve 96L) disconnects the respective park brake 40L from the output of relay valve 94 and instead connects it to the output of proportional valve 76 on line L5. The effect of the proportional valve 76 is to reduce the opening pressure applied to the park brake 40L as the closure pressure on the corresponding service brake 38L is increased (so fluid pressure applied on the park brake is substantially inversely proportional to that applied on the service brake) such that the braking force applied by the park brake is substantially proportional to that applied by the service brake. This proportional application of the park brake during brake steering reduces the ground damage that may otherwise occur if maximum park brake force were applied regardless of service braking force (as would be the case with the above-mentioned combined park and service brake arrangement of DE9204417U1).

Figure 4:
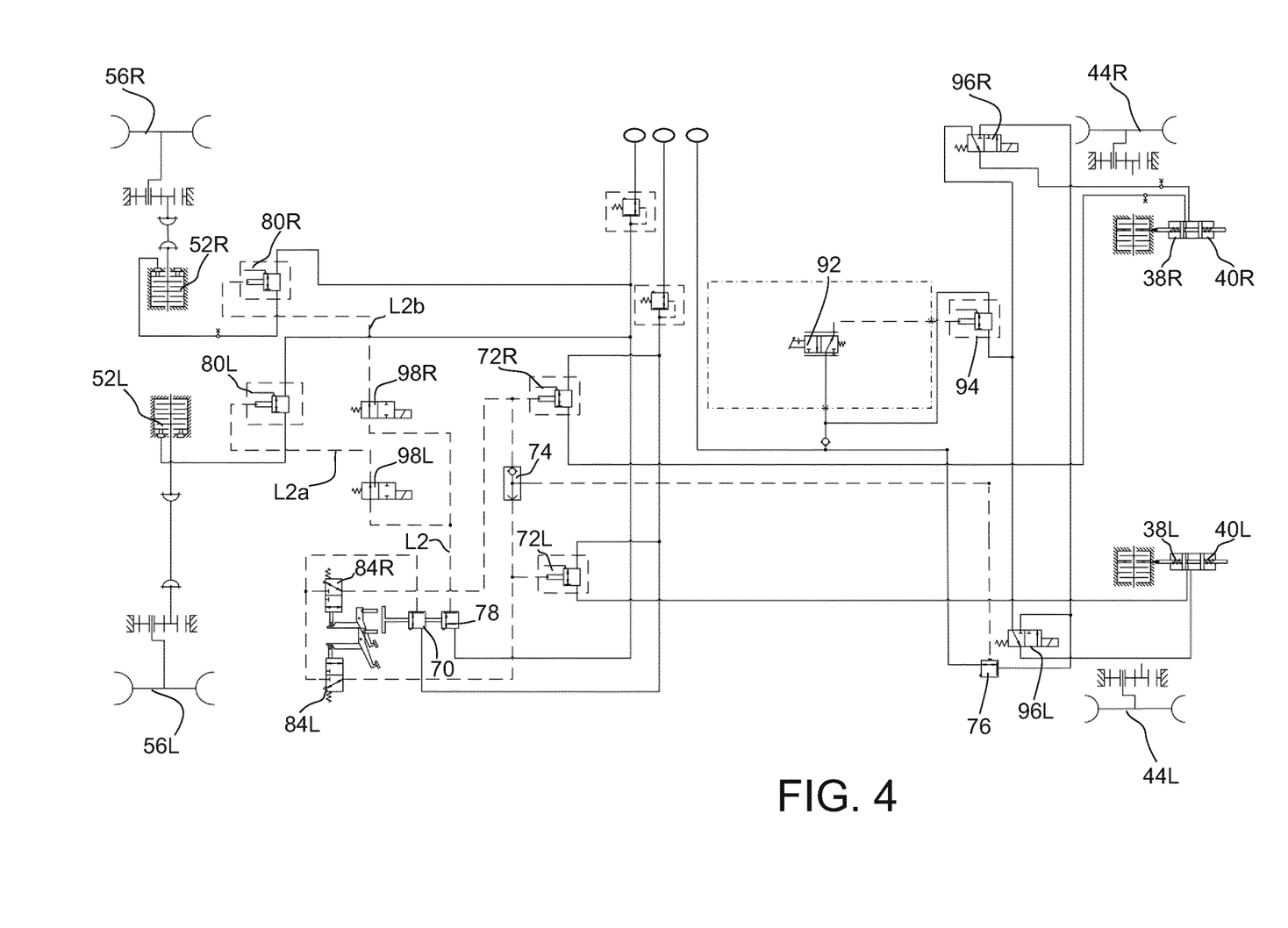
FIG. 4 is a schematic circuit diagram of a further embodiment of a pneumatically operable brake system for the tractor of FIG. 1.

FIG. 4 shows an alternative embodiment of the invention in which the pedal-operated front brake valves 86L, 86R are replaced by solenoid-operated valves 98L, 98R connected between the line L2 output of second control valve 78 and the respective front brake valves 80L, 80R operating left and right front service brakes 52L, 52R. Other components of the arrangement of FIG. 4 are the same as in FIG. 3, are denoted by the same reference numerals, and will not be further described.

The brake circuit shown in FIG. 4 may be adapted to a full electronic braking system (brake by wire) wherein the left rear brake valve 84L and the right rear brake valve 84R are not directly connected to two foot pedals 82L, 82R. Instead, solenoid valves are used to activate the rear service brakes 38L, 38R. The movement of the two foot pedals 82L, 82R may then be measured by sensors and forwarded to control unit 62, which in turn controls the solenoid valves. Furthermore, such a brake system may be provided with only one foot pedal. A further activation means may be provided so that the driver can activate steering brake operation or the system may automatically activate steering brake depending on sensed parameters (vehicle speed, field/road operation, etc.). Furthermore the park brake control valve 92 may be also solenoid valves (connected with control system 62) which is operable to connect the fluid supply, via a relay valve 94 and respective left and right rear solenoid valves 96L, 96R, to release or activate the park brakes 40L, 40R. In such an arrangement, the brake force of the park brake under normal operating condition, cannot be controlled by the driver, only ON/OFF condition is possible.

Whilst the above arrangement described is intended for use as a pneumatic circuit, it is envisaged that the above described brake arrangement can also be operated hydraulically.

Figure 5:
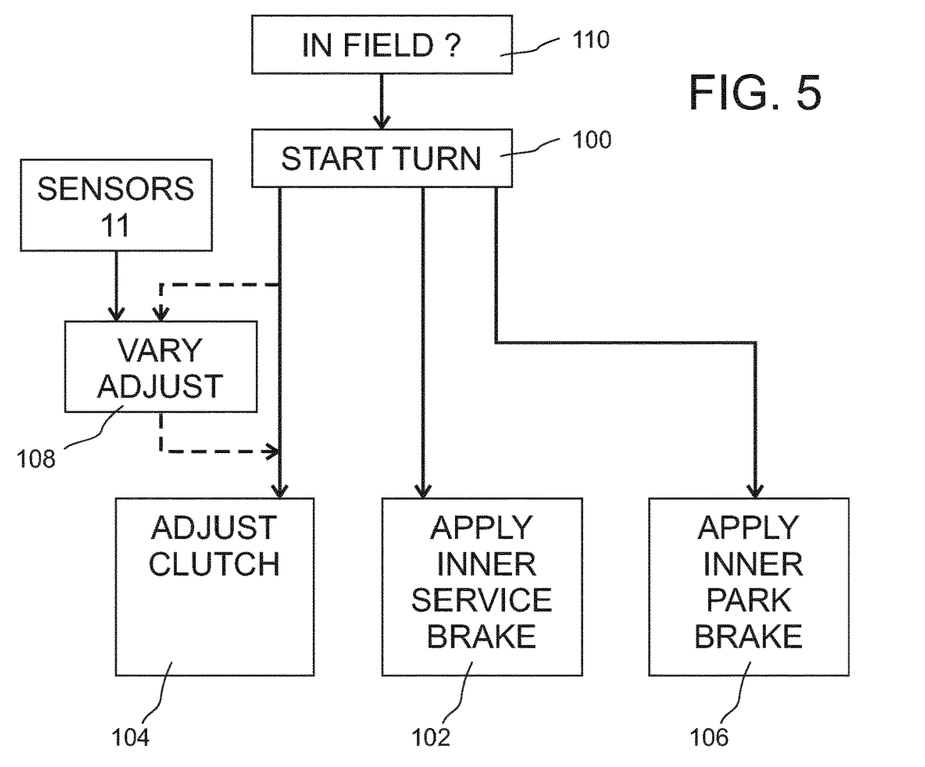
FIG. 5 represents a method of brake steering as may be effected by the tractor of FIG. 1.

FIG. 5 represents a method of brake steering as may be effected by the tractor 10 of FIG. 1 under the direction of the control system 62. On the vehicle entering a turn at 100, the service brakes of the front and rear wheels on the inside of the turn are applied by the user at 102 and at the same time at 104 the clutch arrangement (60; FIG. 2) is controllably varied to adapt the share of the available torque between the front and rear axles. Also on entering a turn, at 106 the parking brake on the rear wheel on the inside of the turn is applied.

Figure 6:
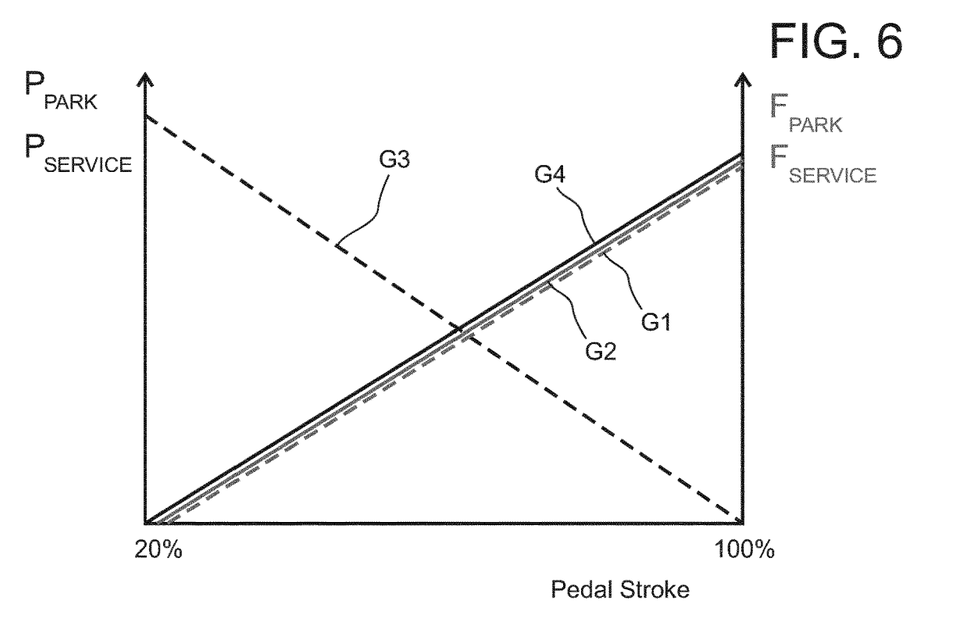
FIG. 6 represents a relationship between applied service and park brake forces.

As described above and represented in FIG. 6 (with the pedal stroke of pedals 82L or 82R depicted on the horizontal axis while the brake forces/fluid pressures are depicted on the vertical axis), the controllably varied level of braking force applied by the parking brake (as depicted with graph G1) is preferably substantially proportional to the level of applied service brake force (as depicted with graph G2) while the fluid pressure applied on the park brake (as depicted with graph G3) is substantially inversely proportional to that applied on the service brake (as depicted with graph G4). The graphs G1 and G2 may show equal values but are depicted with a small offset for clarity reasons. The pedal stroke shown on the horizontal axis starts with 20% which means that before, no brakes are actuated but e.g. the brake lights are anyway switched on, e.g. at a stroke of 10% before the vehicle is braked.

Referring back to FIG. 5, with the adaption at 104, the share of the available torque delivered to the front axle may be altered by a fixed amount, e.g. to be approximately 30% higher than that delivered before entering a turn. Alternatively, at 108 an optional step prior to adjusting the clutch (at 102) comprises adjusting the degree of variation based on external factors identified by the sensors 11, such as:
- gross weight of the vehicle;
- amount of front and/or rear ballasting carried by the vehicle;
- weighting information pertaining to a towed or carried implement;
- extent of measured wheel-slip for one or more wheels of the vehicle;
- tyre pressure in one or more tyres on respective wheels of the vehicle;
- angle of turn directed by a user of the vehicle;
- current speed of the vehicle;
- ambient conditions external to the vehicle.

If sensor input indicates the vehicle is heavier at the rear, the control system 62 may not activate the front service brake, while when the vehicle is heavier at the front, the system may not activate the additional brake force supplied by park brake. This situative brake control enables an efficient operation avoid excessive brake force to reduce soil damages. An ABS sensor giving wheel speeds to determine tyre slip may then be used for control of brakes and clutch.

As brake steering should only be used in field conditions, and not on the road, a further determination may be made at 110 prior to the start of a turn at 100 as to whether the vehicle is in a "safe" geographical location, namely a field. This determination may be made automatically in control system 62 on the basis of input from the geographical positioning system 15 (FIG. 1).

In the foregoing the applicants have described A method of brake steering in a four-wheel drive utility vehicle having a driven front axle carrying at least two front wheels, a driven rear axle carrying at least two rear wheels, a powertrain delivering torque to the front and rear axles via a connecting shaft, a controlled clutch arrangement in the connecting shaft operable to vary the distribution of delivered torque between the front and rear axles, and independently operable service brakes on each of the front and rear wheels. The method comprises, on the vehicle entering a turn, applying the service brakes of the front and rear wheels on the inside of the turn and adjusting the clutch arrangement to adapt the share of the available torque between the front and rear axles. Additional braking force may be applied from independently operable park brakes on the rear wheels in inverse relationship to the level of service brake force applied.

From reading of the present disclosure, other modifications will be apparent to those skilled in the art. Such modifications may involve other features which are already known in the field of vehicle driveline and braking systems and component parts therefore and which may be used instead of or in addition to features described herein.

The invention claimed is:

1. A method of brake steering in a four-wheel drive utility vehicle comprising:
   carrying at least two front wheels on a driven front axle;
   carrying at least two rear wheels on a driven rear axle;
   delivering torque to the front and rear axles via a powertrain and a connecting shaft;
   entering a turn;
   applying independently operable service brakes on each of the front and rear wheels on an inside of the turn; and
   adjusting a controlled clutch arrangement in the connecting shaft to vary distribution of the delivered torque between the front and rear axles.

2. The method of brake steering as claimed in claim 1 additionally comprising applying independently operable parking brakes on each of the rear wheels to a predetermined level of braking force, on the each rear wheel on the inside of the turn.

3. The method of brake steering as claimed in claim 2, wherein the level of braking force applied to the each rear wheel on entering the turn is proportional to a level of braking force applied by the service brakes on the each same wheel.

4. The method of brake steering of claim 1, further comprising determining a level of braking force applied by the service brakes from a pressure level exerted on a brake control.

5. The method of brake steering of claim 1, wherein, on entering the turn, the torque delivered to the front axle is higher than the torque delivered to the front axle before entering the turn.

6. The method of brake steering of claim 1, wherein, on entering the turn, the distribution of torque delivered to the front axle, in comparison to that delivered before entering the turn, is controllably varied based on one or more of the following factors:
   gross weight of the vehicle;
   amount of front and/or rear ballasting carried by the vehicle;
   weight of a towed or carried implement;
   extent of measured wheel-slip for one or more wheels of the vehicle;

tyre pressure in one or more tyres on respective wheels of the vehicle;
angle of turn of the vehicle;
speed of the vehicle;
ambient conditions external to the vehicle.

7. A driveline for a four-wheel drive utility vehicle comprising:
a driven front axle carrying at least two front wheels;
a driven rear axle carrying at least two rear wheels;
a powertrain delivering torque to the front and rear axles via a connecting shaft;
a controlled clutch arrangement in the connecting shaft configured to vary distribution of the delivered torque between the front and rear axles;
independently operable service brakes on each of the front and rear wheels; and
a control system coupled with the powertrain, the clutch arrangement and the service brakes, and configured to detect when the vehicle enters a turn, apply the service brakes of the front and rear wheels on an inside of the turn, and adjust the clutch arrangement to vary the distribution of the delivered torque between the front and rear axles.

8. The driveline as claimed in claim 7, further comprising independently-operable parking brakes on the rear wheels, wherein the control system is further configured on detecting that the vehicle is entering the turn to apply a predetermined level of braking force to the parking brake on the rear wheel on the inside of the turn.

9. The driveline as claimed in claim 8, wherein the control system is configured to determine and apply the level of parking brake braking force to the rear wheel on entering the turn that is inversely proportional to a level of the service brake braking force applied to the same wheel.

10. The driveline of claim 7, further comprising a user-operable brake control and sensor for determining a pressure applied to the brake control, wherein the control system is configured to set a level of service brake braking force applied during the turn based on a level of pressure exerted on the brake control.

11. The driveline of claim 7, wherein the control system is configured, on detection of entry to the turn, to cause the clutch arrangement to increase the distribution of the torque delivered to the front axle to a higher torque than the torque delivered to the front axle before entering the turn.

12. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input of gross weight of the vehicle.

13. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input of front and/or rear ballasting carried by the vehicle.

14. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input of weight of an implement towed or carried by the vehicle.

15. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input of tyre pressure in one or more tyres on the wheels of the vehicle.

16. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input of a measured wheel-slip for one or more of the wheels of the vehicle.

17. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input angle of the turn.

18. The driveline of claim 7, wherein the control system comprises an input for data and is configured, on detection of entry to the turn, to cause the clutch arrangement to vary the distribution of the torque delivered to the front axle, in comparison to that delivered before entering the turn, based on an input of current speed of the vehicle.

19. The driveline of claim 7, wherein the control system comprises an input for data and is configured, on detection of entry to the turn, to cause the clutch arrangement to vary the distribution of the torque delivered to the front axle, in comparison to that delivered before entering the turn, based on input of ambient conditions external to the vehicle.

20. The driveline of claim 7, wherein the control system comprises an input for data coupled to one or more sensors.

21. The driveline of claim 7, wherein the control system comprises an input for data coupled to one or more user-operable data input devices.

22. A utility vehicle comprising the driveline of claim 7.

23. The utility vehicle as claimed in claim 22, further comprising a geographical positioning system coupled with the control system, with the control system being configured to not implement brake steering on determination that the vehicle is outside of a predetermined geographical area.

* * * * *